C. O. THOMAS, Jr.
FIELD COOKING OUTFIT.
APPLICATION FILED SEPT. 28, 1914.
1,173,396.
Patented Feb. 29, 1916.
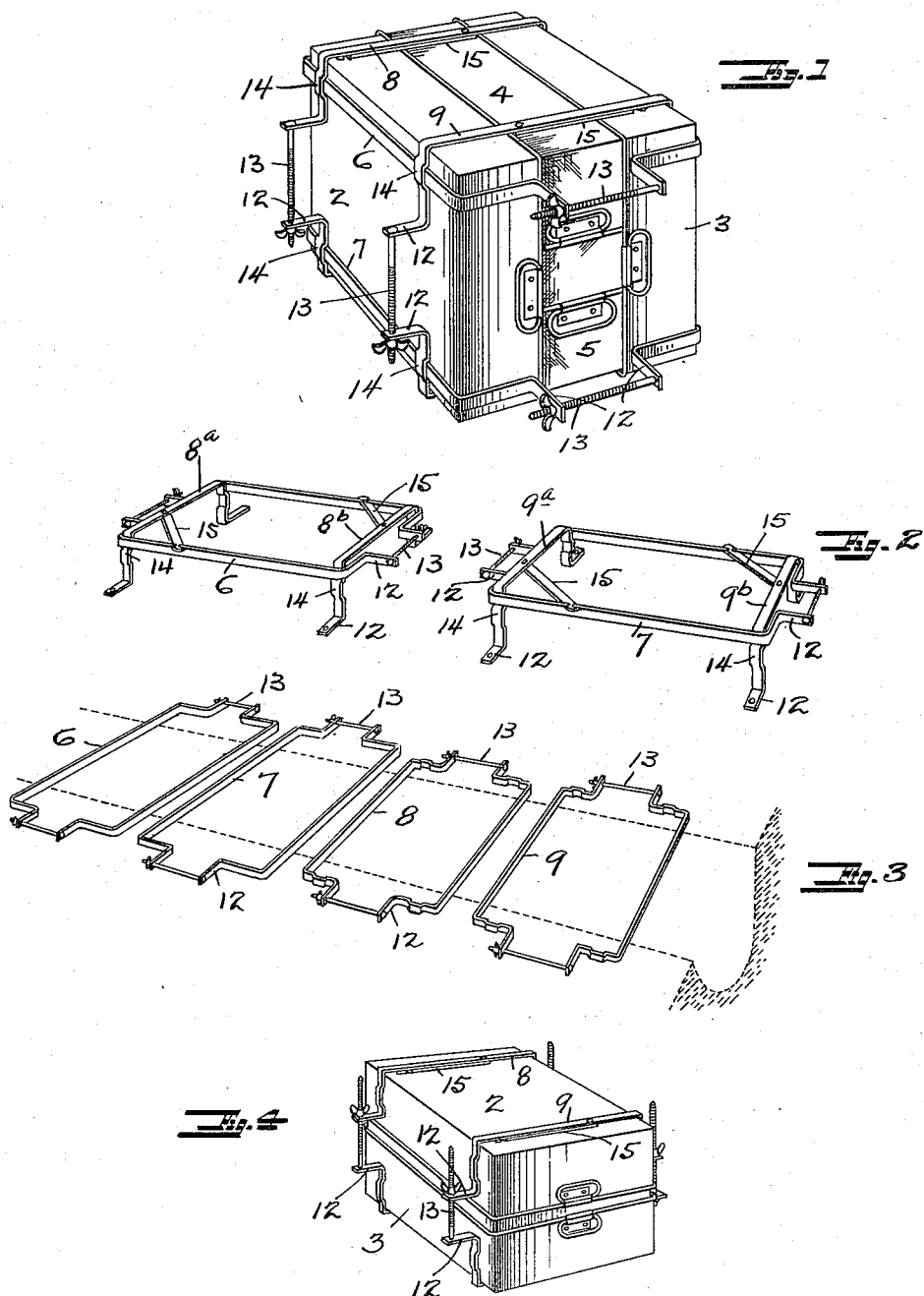
WITNESSES:
H. J. Prest.
J. B. Gardner
INVENTOR.
C. O. THOMAS, JR.
BY Miller & White
his ATTORNEYS.
THE COLUMBIA PLANOGRAPH CO., WASHINGTON, D. C.

UNITED STATES PATENT OFFICE.

CHARLES O. THOMAS, JR., OF THE UNITED STATES ARMY, ASSIGNOR TO HOLBROOK, MERRILL AND STETSON, A CORPORATION OF CALIFORNIA.

FIELD COOKING OUTFIT.

1,173,396.  Specification of Letters Patent.  Patented Feb. 29, 1916.

Application filed September 28, 1914. Serial No. 863,914.

*To all whom it may concern:*

Be it known that I, CHARLES O. THOMAS, Jr., a citizen of the United States, and an officer in the United States Army, now stationed at the Presidio of Monterey, county of Monterey, State of California, have invented certain new and useful Improvements in Field Cooking Outfits, of which the following is a specification.

The invention relates to portable cooking outfits for use by the army or other bodies of men in the field.

An object of the invention is to provide a complete cooking outfit for a large body of men, which can be nested and packed so that it occupies small space.

Another object of the invention is to provide a portable cooking outfit in which the grids or grates upon which the cooking utensils set when in use, serve as straps for binding the utensils together when packed.

Another object of the invention is to provide a complete set of utensils of such relative size that they nest one within the other when packed.

The invention possesses other advantageous features, some of which, with the foregoing, will be set forth at length in the following description, where I shall outline in full that form of the invention which I have selected for illustration in the drawings accompanying and forming part of the present specification. In the drawings, I have shown only one specific form of my generic invention, but it is to be understood that I do not limit myself to such form because my invention may be embodied in a multiplicity of forms, each being a species of my said invention. It is also to be understood that by the claims succeeding the description of my invention, I desire to cover the invention in whatever form it may be embodied.

Referring to said drawings; Figure 1 is a perspective view of the complete outfit in shape for transportation. Fig. 2 is a perspective view of the binding straps arranged to support the cooking utensils over a fire. Fig. 3 is a perspective view of a different arrangement of the binding straps employed as grids and arranged over a trench in which the fire is made. Fig. 4 is a perspective view of one-half of the outfit packed for transportation.

I have found that the complete outfit shown packed in Fig. 1 is large enough in cooking capacity to provide for a company of infantry, or organizations of such size, which range from 150 to 200 men. The half-sized outfit shown in Fig. 4 is ample for a troop of cavalry, or other organizations, ranging from 75 to 100 men. The complete outfit consists of four roasting pans 2—3—4—5, the pans 4 and 5 being shorter than pans 3 and 4, so that they may nest within them as shown in Fig. 1. Within the inclosure formed by the four pans, are arranged various other cooking utensils, comprising two large boiling kettles, each having a smaller kettle nesting therein, corrugated removable bottoms for the roasting pans, and all of the other implements, such as knives, spoons, saws, etc., necessary in cooking. The boiling kettles are of the same general shape as ordinary wash boilers, and are of a length slightly less than the length of the roasting pans, and of a height slightly less than the width of the pans, so that they may be arranged within the inclosure formed by the four pans. In the half size outfit shown in Fig. 4 only two roasting pans and one large boiler, and one small boiler, with the other necessary implements, are used, the boiler being wider than twice the height of one of the pans.

The whole outfit is bound tightly together with metallic straps and bands so that it may be readily transported. In the construction shown in Fig. 1, two sets of straps are used, one set encircling the outer pans 2—3 longitudinally, and the other set encircling them transversely. The straps 6—7 are first applied and then the straps 8—9 are applied. Each strap consists of two parts and the ends of each part are bent outward at right angles to the parts forming lugs 12 through which the bolts 13 pass by means of which the straps are clamped tightly to the pack. The straps 6 and 7 are arranged adjacent the longitudinal edges of the pans, and the straps 8 and 9 are provided with offset portions 14 at the points where they pass over the straps 6 and 7.

The various straps are designed so that when they are removed from the pack they may be used as grids upon which the cooking utensils are supported. The straps may be used as shown in Fig. 3, in which case they are arranged transversely over a ditch dug in the earth, but I prefer to use them as shown in Fig. 2 in which case no ditch or only a shallow ditch need be dug. In this arrangement each strap 8—9 is separated into its two parts $8^a$—$8^b$—$9^a$—$9^b$— and the straps are set up with the lugs 12 serving as feet. The two strap portions $8^a$—$8^b$ or $9^a$—$9^b$ are encircled by the strap 6, which rests on the offset portions 14 and which is clamped thereto by the bolts 13. The grid frame thus produced is cross-braced by means of arms 15, pivotally attached to the body portion of the strap portions $8^a$—$8^b$—$9^a$—$9^b$. These arms are moved into notches or apertures in the straps 6 or 7 and serve as struts to brace the frame against twisting strains.

The invention produces a compact and readily carried outfit which is large enough to supply the needs of a large number of men, and the binding straps are so constructed that when removed from the pack they may be formed into rigid frames on which the cooking utensils may be supported above the ground or over the fire.

I claim:

1. In a portable field cooking outfit, a plurality of cooking utensils adapted to be nested, metallic straps adapted to encircle and bind said nested utensils together, said straps encircling said nested utensils in non-parallel planes, one of the said straps having offset portions where it overlies the other strap, outstanding lugs on said straps, and bolts engaging said lugs for the purpose of tightening the straps around the utensils.

2. In a portable field cooking outfit, a plurality of cooking utensils, pans surrounding and inclosing the cooking utensils, two-part metallic straps encircling said pans transversely and longitudinally, said straps being adapted to be assembled into a grid for said pans when removed therefrom and an arm pivoted to one of said straps adapted to engage another of said straps when the straps are so assembled.

3. In a portable field cooking outfit, two metallic strap portions having horizontal and vertical portions, the vertical portions having offset portions, an adjustable metallic frame adapted to encircle said strap portions and rest on said offset portions, and arms pivoted to the horizontal portions of said strap portions adapted to removably engage said frame.

In testimony whereof, I have hereunto set my hand at Monterey, California, this 21st day of September, 1914.

CHARLES O. THOMAS, JR.

In presence of—
W. G. HUDSON,
M. JORDAN.

Copies of this patent may be obtained for five cents each, by addressing the "Commissioner of Patents, Washington, D. C."